(12) United States Patent
Wallace et al.

(10) Patent No.: US 10,295,400 B2
(45) Date of Patent: May 21, 2019

(54) BEVERAGE COASTER WITH INTEGRATED ELECTRONICS

(71) Applicant: Perfect Company, Inc., Vancouver, WA (US)

(72) Inventors: Michael Wayne Wallace, Vancouver, WA (US); Philip Trevor Odom, Portland, OR (US)

(73) Assignee: Perfect Company, Inc., Vancouver, WA (US)

( * ) Notice: Subject to any disclaimer, the term of this patent is extended or adjusted under 35 U.S.C. 154(b) by 0 days.

(21) Appl. No.: 15/687,383

(22) Filed: Aug. 25, 2017

(65) Prior Publication Data

US 2019/0063988 A1 Feb. 28, 2019

(51) Int. Cl.
| | |
|---|---|
| *G08B 1/08* | (2006.01) |
| *G01G 19/52* | (2006.01) |
| *A47G 23/03* | (2006.01) |
| *G08B 5/22* | (2006.01) |
| *G01G 23/32* | (2006.01) |

(52) U.S. Cl.
CPC ......... *G01G 19/52* (2013.01); *A47G 23/0309* (2013.01); *G01G 23/32* (2013.01); *G08B 5/226* (2013.01)

(58) Field of Classification Search
CPC ........ G01G 19/40; G01G 23/18; A47G 23/00; G01L 1/04; G08B 1/08
See application file for complete search history.

(56) References Cited

U.S. PATENT DOCUMENTS

| | | | | |
|---|---|---|---|---|
| 4,836,488 A * | 6/1989 | Ross | ..................... | A47B 13/16 248/154 |
| 5,413,302 A * | 5/1995 | Ferster | ................ | A47G 23/032 248/154 |
| 7,353,136 B2 * | 4/2008 | Vock | .................... | A43B 3/0005 702/173 |
| 8,915,391 B2 * | 12/2014 | Radow | .................. | A47G 19/00 108/139 |
| 9,983,049 B2 * | 5/2018 | Kumar | ............... | G01G 19/4146 |
| 2015/0182053 A1 * | 7/2015 | Woods | ............... | A47G 23/0313 248/346.11 |
| 2016/0045049 A1 * | 2/2016 | Kim | ....................... | G01G 17/06 248/550 |

* cited by examiner

*Primary Examiner* — Phung Nguyen
(74) *Attorney, Agent, or Firm* — Lee & Hayes, P.C.

(57) ABSTRACT

A beverage coaster includes integrated electronics, such as a power system, a load cell, an analog to digital converter and a wireless transceiver. The beverage coaster communicates with a computing device to send information, such as a first weight, a second weight, and a third weight of objects placed on the beverage coaster. The first weight may be associated with a container, a second weight may be associated with a first ingredient, and the third weight may be associated with a second ingredient. The computing device is configured to display information related to the first, second, and third weights and provide instructions to a user thereof for maintaining proper proportions of the first and second ingredients as the user adds them to the container.

17 Claims, 10 Drawing Sheets

BEVERAGE COASTER WITH INTEGRATED ELECTRONICS

BACKGROUND

The art of mixology requires the mixing of various ingredients in specified ratios. Many recipes for mixed drinks include a measured volume of liquid ingredients to be mixed. However, maintaining a precise ratio of one ingredient to the next can be a difficult balance, especially if one of the ingredients is added to the concoction in an incorrect volume. An imbalance of one or more ingredients that deviates from the prescribed ratio in a mixed beverage can lead to one or more problems. These may include beverages that are not pleasing to the taste, wasted ingredients, ingredient cost changes due to ingredient adjustments, and a variable raw material cost, particularly where relatively expensive ingredients are used.

Furthermore, beverage distributors may desire that their beverages are used in mixed drinks in a way that highlights the flavor of a beverage in a pleasing way and thus, have a desire for partakers of the beverage to properly mix the beverages according to trusted mixology ratios set forth in recipes.

Historically, it has been difficult to recreate mixed beverages with certainty because precise ratios are needed. In addition, oftentimes the ingredients are not accurately measured.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Embodiments of the present disclosure are directed to, among other things, methods and systems for providing a beverage coaster having integrated electronics. According to some embodiments, the beverage coaster has an integrated scale that measures incremental additions to a container placed on the coaster. The coaster may also support an indication of the weight on a related display. The display may be on a user interface of the coaster and/or of a computing device, or similar.

Figure 1:
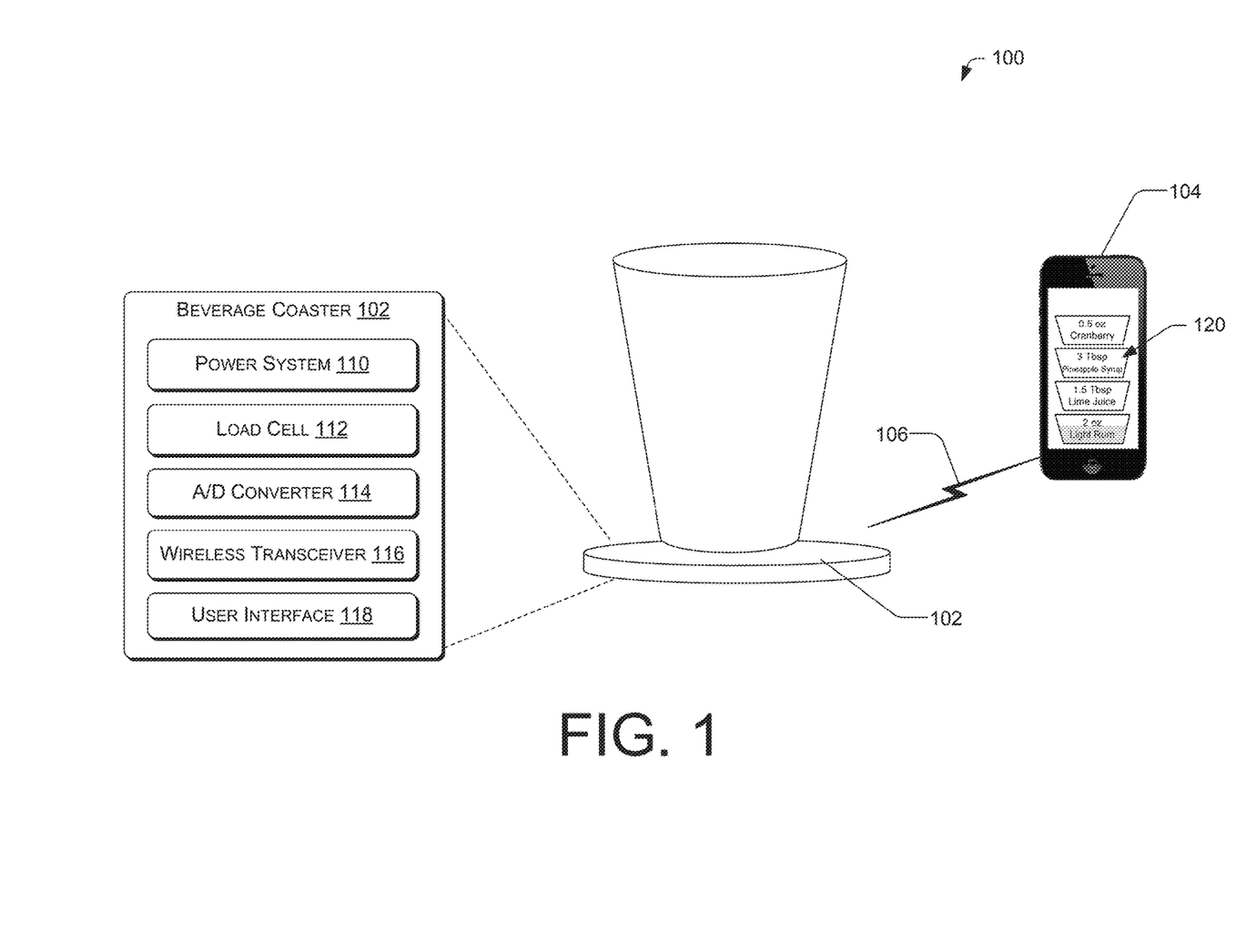
FIG. 1 is a block diagram illustrating an example of a system providing for accurate mixology utilizing a beverage coaster with integrated electronics.

With reference to FIG. 1, the system 100 includes a beverage coaster 102 and a computing device 104 that are configured for wireless communication 106, such as through a near field communication protocol, which in some embodiments, is Bluetooth. More specifically, the Bluetooth low energy protocol ("BLE") may be utilized in some embodiments for uni-directional or bi-directional communication between the beverage coaster 102 and the computing device 104. BLE typically requires less power than many other forms of wireless communication which allows the beverage coaster 102 to remain in operation over longer periods of time before charging or swapping one or more batteries within the beverage coaster 102 is required.

The beverage coaster 102 may include at least a power system 110, one or more load cells 112, an analog to digital converter ("A/D converter") 114, a wireless transceiver 116, such as a Bluetooth low energy transceiver, and a user interface 118.

The power system 110 may include one or more batteries to provide power to the components within the beverage coaster 102. The one or more batteries may be button cell batteries, such as batteries conforming to the CR2032 standard which supply 3V. Two or more batteries may be arranged in series to provide any multiple of 3V. IN some embodiments, two batteries are provided in series to provide 6V, which may be regulated to any desired voltage, such as 3V. Of course, the power system 110 may include a corded connection to electrical supply provided by a wall outlet or other external power source, as desired. Furthermore, a charging port may be provided that accepts a charging cable to charge the one or more internal batteries from an external power source.

The one or more load cells 112 may be any suitable load cell, such as, for example, one or more half-bridge load cells, quarter-bridge load cells, or full-bridge load cells, or any combination of various load cells. Moreover, the load cells may be arranged in a suitable arrangement to detect small deflections in the load cell, and may be arranged in a Wheatstone bridge configuration. According to some implementations, the one or more load cells 112 are energized with electricity, and deflection of the load cell due to weight being applied causes a change in resistance to the load cell. Even small changes to the resistance of the load cell can be detected and converted into a precise weight measurement.

The A/D converter 114 may convert the analog input resistance measurement of the load cell to a digital signal proportional to a weight measurement responsible for causing the change in resistance of the load cell.

The wireless transceiver 116 may be configured to communicate with a computing device that is separate from the beverage coaster 102. In some embodiments, the wireless transceiver 116 utilizes the Bluetooth low energy technology, which provides for low power and low energy usage that allows a battery to last for a long time within the device before needing to be recharged or replaced. The low power requirements of BLE technology may allow the beverage coaster 102 to always remain powered on. In other embodiments, the beverage coaster 102 may utilize proximity sensing technology to selectively activate the wireless transceiver 116 and energize the load cell 112. Still other ways of activating the wireless transceiver 116 and energizing the load cell 112 may be used, including sensing a weight being applied to the beverage coaster 102, or through the user interface 118 of the beverage coaster. In some cases, the wireless transceiver 116 may be active and the load cell 112 may only be energized upon a wireless connection with a computing device 104 that indicates a readiness to receive a weight measurement from the beverage coaster 102.

Figure 2:
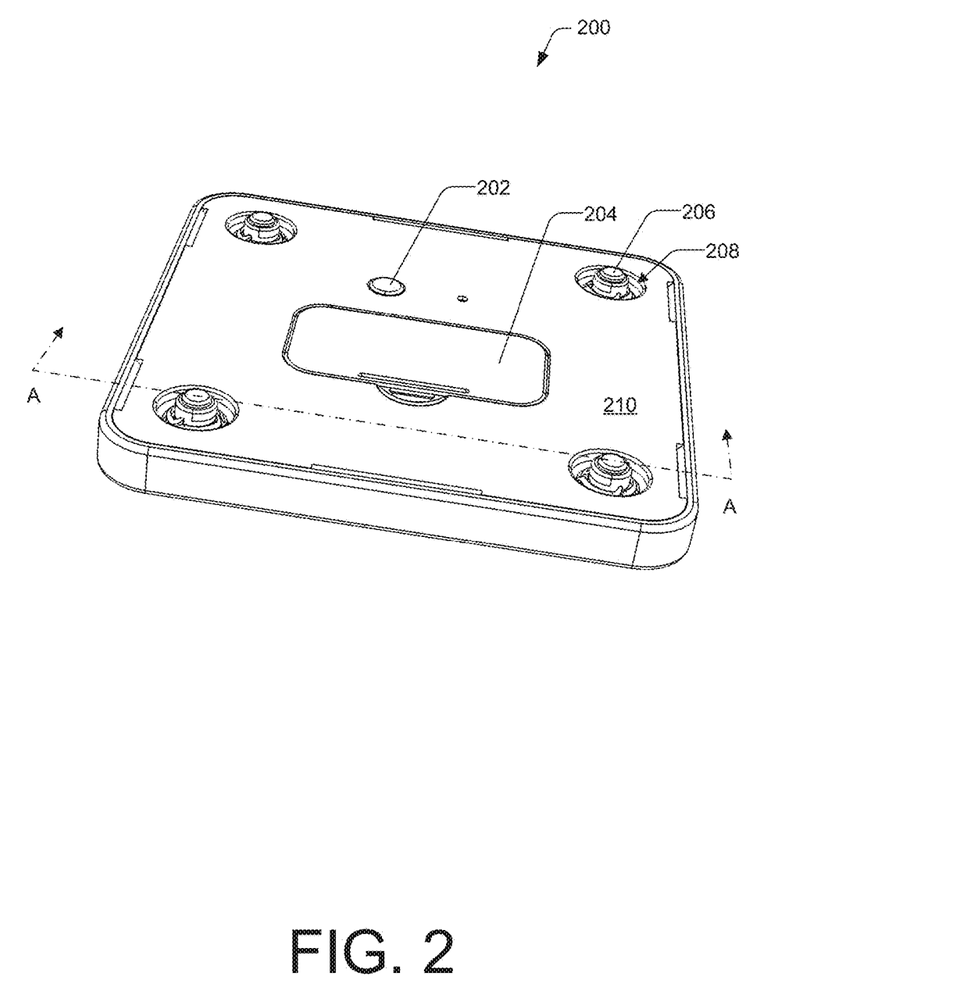
FIG. 2 is an isometric diagram of the underside of an example beverage coaster with integrated electronics.

In some embodiments, the user interface 118 may comprise a button (such as 202 of FIG. 2). The user interface 118 may also (or alternatively) comprise a light, such as a light emitting diode, that can provide feedback to a user. The light may emanate from the perimeter of the beverage coaster 102, from underneath the beverage coaster 102, from the top of the beverage coaster 102, or from some other location or portions of the beverage coaster 102, or similar. The light source may be mounted to a surface of the beverage coaster 102. In this way, it may protrude through the beverage coaster 102 and provide direct light. The light source also may be mounted inside the beverage coaster 102 and provide indirect light such as through one or more translucent or transparent portions of the beverage coaster 102, or similar.

In one embodiment, the user interface comprises only a single button 202 and a single light. The button 202 may be used to turn on and turn off the device, and may also be used to put the beverage coaster 102 into a pairing mode. The light may be used to provide visual feedback to the user. The light may serve to indicate successful pairing with a computing device 104 and/or to indicate that a target measurement has been met, or for some other purpose, or similar.

According to some embodiments, the user interface may comprise the top surface of the beverage coaster 102. The one or more load cells 112 are configured to detect a deflection of the load cell 112 due to a weight being placed upon the beverage coaster 102. As such, the load cells 112 can detect a force applied to the beverage coaster 102. The beverage coaster 102 may be configured to detect a quick application of a force on the beverage coaster 102, such as a tap. In this way, the load cells may detect a tap on the beverage coaster 102 which may be associated with a user input. The user input through the load cells may correspond to an application of a weight for a time period below a threshold. For instance, if a user applies a load to the beverage coaster 102 that exceeds a predetermined weight threshold for a time period below a time threshold, the input may be interpreted as a command to activate the wireless transceiver 116 and enter a pairing mode.

Similarly, the application of a force on the beverage coaster that exceeds a force threshold may be interpreted as a user input. In other words, user input may be provided to the beverage coaster 102 based upon weight, a time duration, or a combination, or similar. Furthermore, where the beverage coaster 102 contains multiple load cells, a user input might correspond to a location on the coaster at which the user provides the user input. In these embodiments, the beverage coaster 102 may have one or more indications that identify where a user should apply a force to indicate a particular input. For example, the beverage coaster 102 may have markings on a surface that indicate a location for the user to tap to turn on the electronics. As another example, markings may indicate a location for entering pairing mode, and another indicated location to perform a tare function. Other user inputs may be provided by tapping a surface of the beverage coaster 102 at various locations, with various forces, for varying durations, or a particular number of times.

In response to the aforementioned user inputs, the beverage coaster 102 can send data associated with the force to the computing device 104, and the computing device 104 then can interpret the data. In response, the computing device then may send one or more commands to the beverage coaster 102.

FIG. 2 illustrates one embodiment of the underside of a beverage coaster 200. The beverage coaster 200 has a button 202, which can be configured to receive user input, such as for turning on/off the integrated electronics within the beverage coaster, or for some other purpose. A cover 204 may be provided to allow access to the power system within the beverage coaster 200. One or more batteries may be accessible under the cover 204 such as for replacement. In some embodiments, the batteries are rechargeable and can be recharged by inserting an appropriate charging plug into a receptacle built into the beverage coaster 200.

One or more feet 206 are configured to engage a surface when the beverage coaster 200 is place upright onto the surface. In the illustrated embodiment, the feet 206 protrude through an opening 208 in the bottom surface 210 of the beverage coaster 102. The feet 206 may have anti-slip properties to inhibit the beverage coaster 200 from sliding across a surface and to provide a more stable platform for supporting a container with liquids.

Figure 3A:
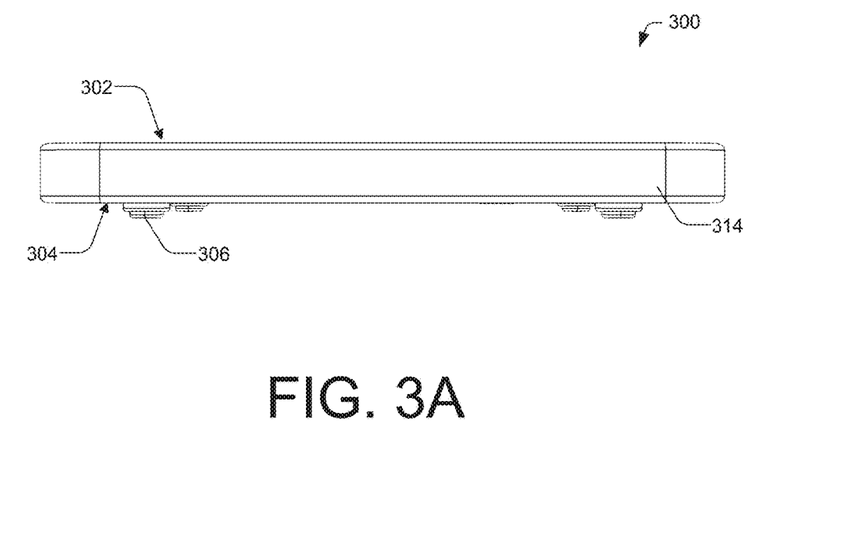
FIG. 3A is a side view of an example beverage coaster with integrated electronics.

With reference to FIG. 3A, a front view of one example beverage coaster 300 is illustrated. A top surface 302 is generally planar and configured to support a container placed thereupon. A bottom surface 304 is spaced a distance from the top surface 302 and defines a thickness of the beverage coaster 300. In many embodiments the thickness is on the order of less than about 0.250 inches, or less than about 0.375 inches, or less than about 0.5 inches. The chosen thickness is not merely a design choice, but rather, is desired not only for the stability of the beverage coaster 300, but also to enable the function of a beverage coaster, as such. That is, a device that is larger than about 0.5 inches thick will not look like a beverage coaster and will not make its purpose known based upon its design. Accordingly, if a user observes a device that is thicker than about 0.5 inches, the purpose of the device will not be apparent. Moreover, elevating a beverage container upon a device that is larger than about 0.5 inches can increase the risk of tipping the beverage container and spilling its contents. Therefore, a low profile beverage coaster, such as less than about 0.5 inches, provides an improved and more functional device than one that has a greater thickness.

One or more feet 306 extend beyond the bottom surface 304 and are configured to contact a surface upon which the beverage coaster 300 is placed. Preferably, the feet extend a similar distance to each other beyond the bottom surface 304 such that they all contact the surface to provide a stable platform upon which to place a container.

Figure 3B:
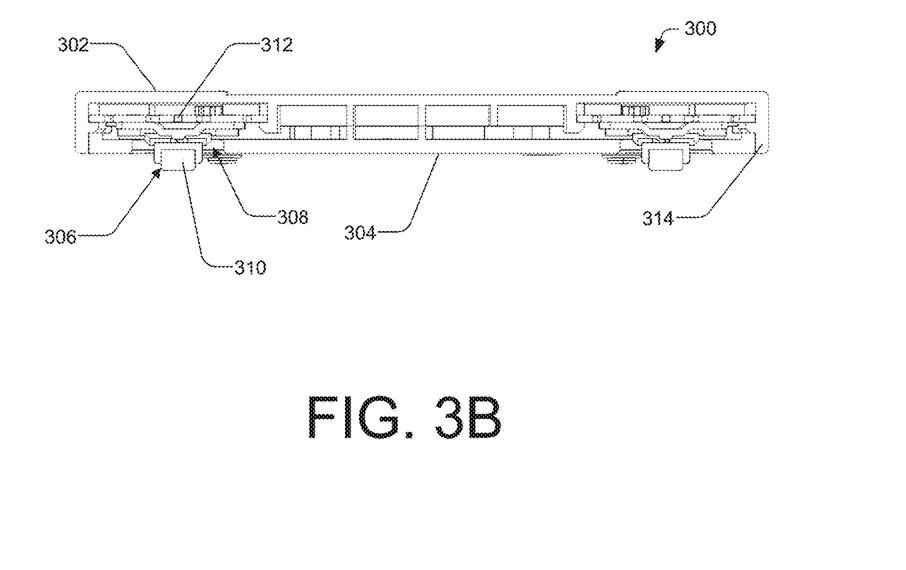
FIG. 3B is a cross-sectional view of a beverage coaster taken along the parting line A-A of FIG. 2.

With reference to FIG. 3B, a cross-sectional view is illustrated that is taken along the line A-A for FIG. 2. As illustrated, one or more feet 306 extend through apertures 308 in the bottom surface 304 to allow the feet 306 to extend therethrough. The feet 306 may be outfitted with a non-slip pad 310 at the distal end that is selected to inhibit the beverage coaster 300 from sliding across a surface. The non-slip pad 310 may be formed of any suitable material, but in some embodiments, may be formed of an elastomer, such as rubber, plastic, a rubberized polymer, a combination of materials, or other such non-slip material.

The feet 306 have a proximal end within the beverage coaster 300 that is coupled to the upper surface 302 such that weight applied to the upper surface 302 is transferred to the feet 306. The proximal end of the feet 306 is attached to a load cell 312 which is, in turn, attached to the upper surface 302. Thus, as a load is applied to the top surface 302 of the beverage coaster 300, the weight is transferred to the load cell 312 and to the feet 306. The weight causes an elastic deformation of the load cell 312, which registers a change in its resistance due to the deformation. The change in resistance is converted by the A/D converter into a numerical value that can be associated with a measured weight.

The beverage coaster 300 has a housing 314 that encompasses the power source, the load cells, the wireless transceiver, and the A/D converter. In some examples, the housing 314 of the beverage coaster 300 is configured to fit within a four inch square and is less than about half an inch thick. In some embodiments, the beverage coaster 300 has an upper surface 302 configured to contact a beverage container and is sized to accommodate the beverage container. That is, the upper surface may be sized to be about sixteen square inches, or may be less than sixteen square inches, such as less than a four-inch by four-inch square. In embodiments in which the beverage coaster 300 is shaped generally circular when viewed from above, the beverage coaster 300 may have a diameter of less than about 4.5 inches, or a diameter of less than about 4 inches. In addition, the upper surface of the beverage coaster 200 may be formed of any suitable material, such as, for example, plastic, cork, wood, a composite material, or some other waterproof or liquid absorbent material.

Figure 4A:
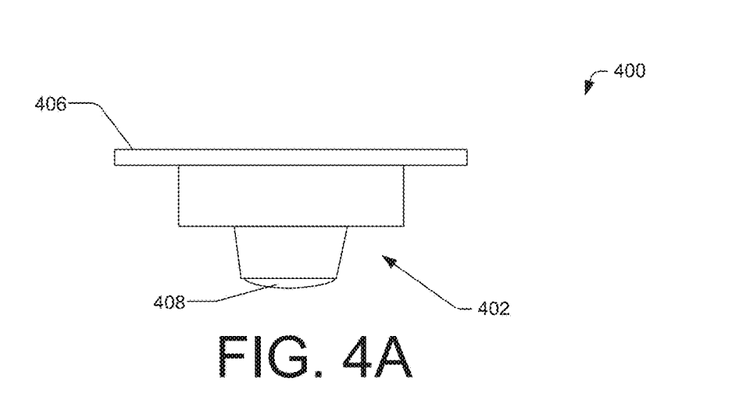
FIG. 4A is a front view block diagram of an example load cell for use in a beverage coaster.
Figure 4B:
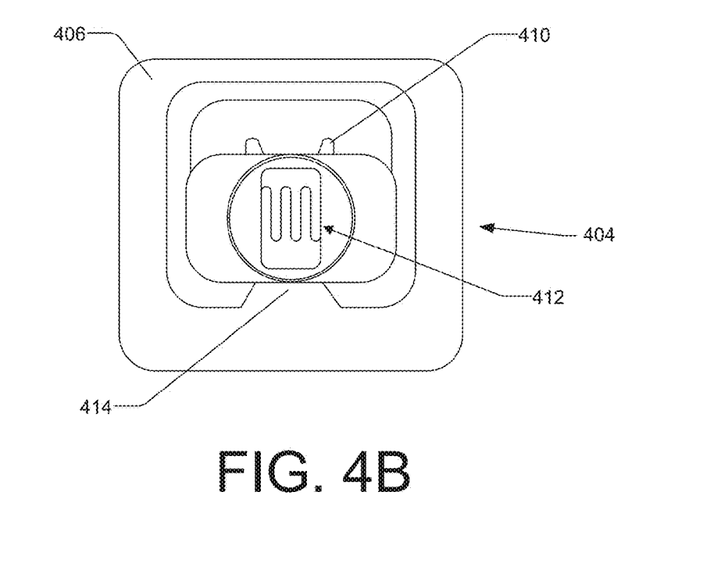
FIG. 4B is a top view block diagram of an example load cell for use in a beverage coaster.

With reference to FIGS. 4A and 4B, one embodiment 400 of a foot 402 with load cell 404 is represented. The foot 402 generally includes a mount 406 that is configured to contact the inner surface of the beverage coaster and mount thereto. Mounting may be through any suitable method, such as by mechanical or chemical fastening, such as screws, adhesives, welding, interference fit, or the like. The foot 402 may include a non-slip pad 408 that contacts a supporting surface, such as a counter or bar top, when the beverage coaster is placed upon it. The non-slip pad, in some embodiments, is formed of an elastomer.

The mount 406 is attached to a flex member 410 which may be cantilevered from the mount 406. In some embodiments, the mount 406 and the flex member 410 are formed of a single piece and are thus integrated. The flex member 410 has a strain gauge 412 coupled thereto. The strain gauge may be adhered or otherwise bonded to the flex member 410. The flex member 410 may also be connected to the foot 402. In use, when a load is placed upon the beverage coaster, the mount 406 experiences the load and transfer the load to the flex member 410 through the cantilevered portion 414. In response, the flex member 410 elastically deforms and transfers the load to the foot 402. As the flex member 410 deforms, the strain gauge 412 also deforms, which causes a change in the resistance of the strain gauge due to its changing physical geometry. The change in resistance can be measured and correlated to the load placed upon the beverage coaster.

The change in resistance can be measured by a Wheatstone bridge and the analog electrical signal can be converted to a digital signal by the A/D converter. Through calibration, the digital signal can be correlated with a weight. According to some embodiments, the load cell can measure loads within a range of about 3 kg with a resolution of about 1 gram.

One or more load cells 404 can be implemented into a single beverage coaster. In some implementations, four load cells 404 are arranged within the beverage coaster. While the beverage coaster can be any suitable shape, such as square, rounded square, circular, annular, toroidal, or any other desired shape, in those instances in which a beverage coaster generally resembles a polygon, one load cell may be positioned in the vicinity of each corner. For example, where the beverage coaster is a rounded square, four load cells may be placed, one near each of the four corners. Where the beverage coaster is generally circular, three, four, or more load cells may be radially spaced about the beverage coaster.

Figure 5:
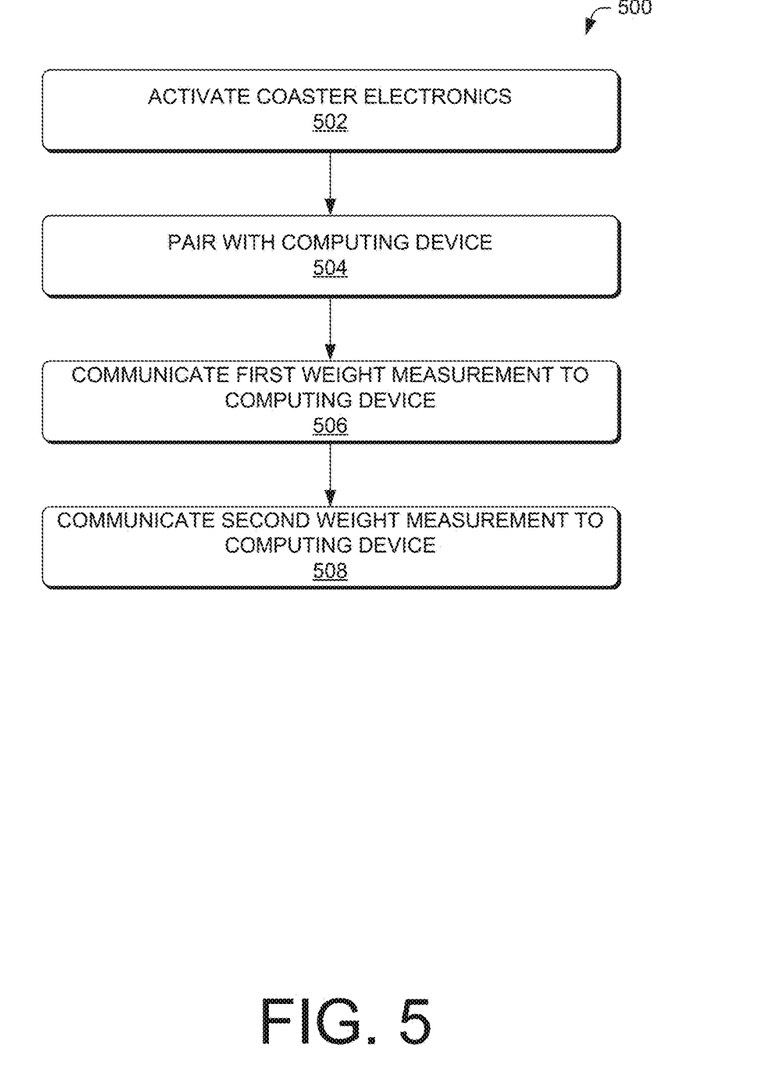
FIG. 5 is a flow diagram of an example process for a beverage coaster in communication with a computing device.
Figure 6:
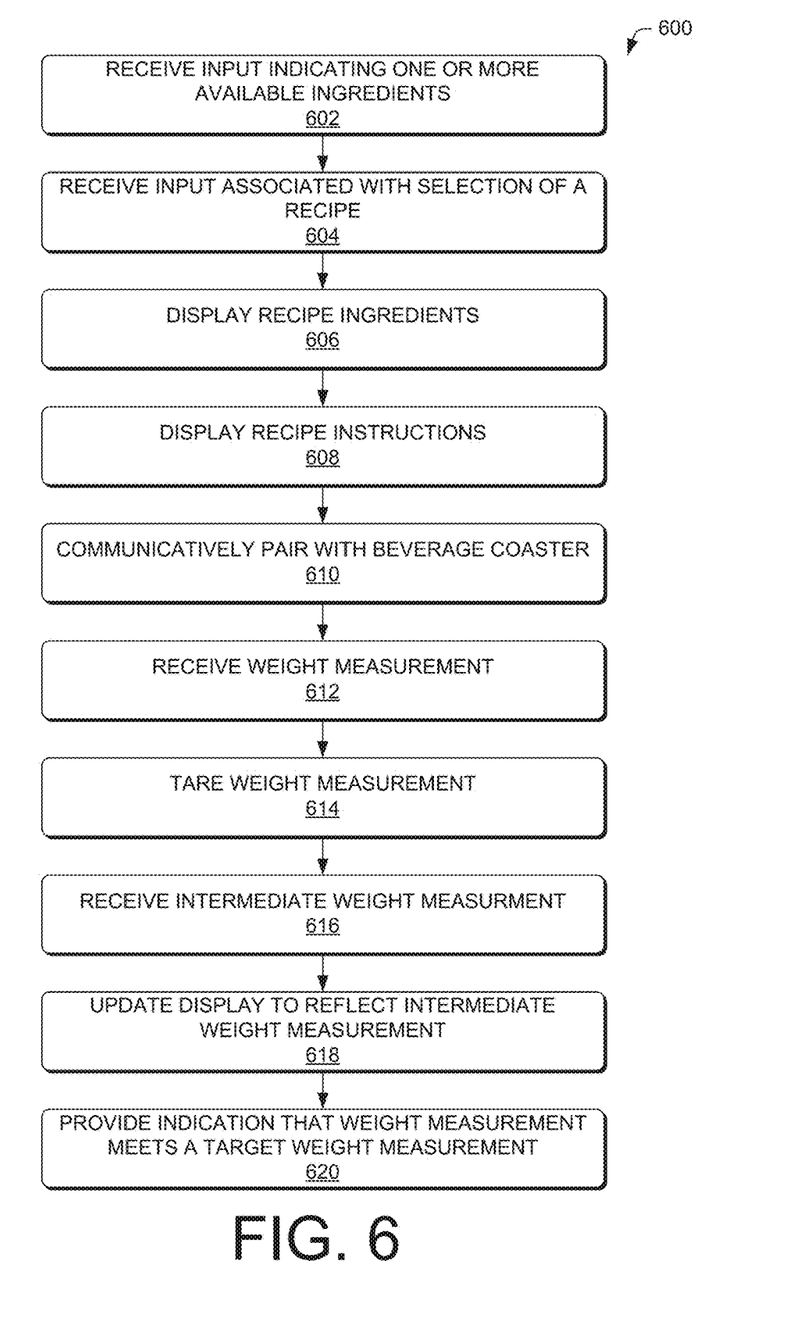
FIG. 6 is a flow diagram of an example process for a computing device communicating with a beverage coaster and providing mixology ratios.
Figure 7:
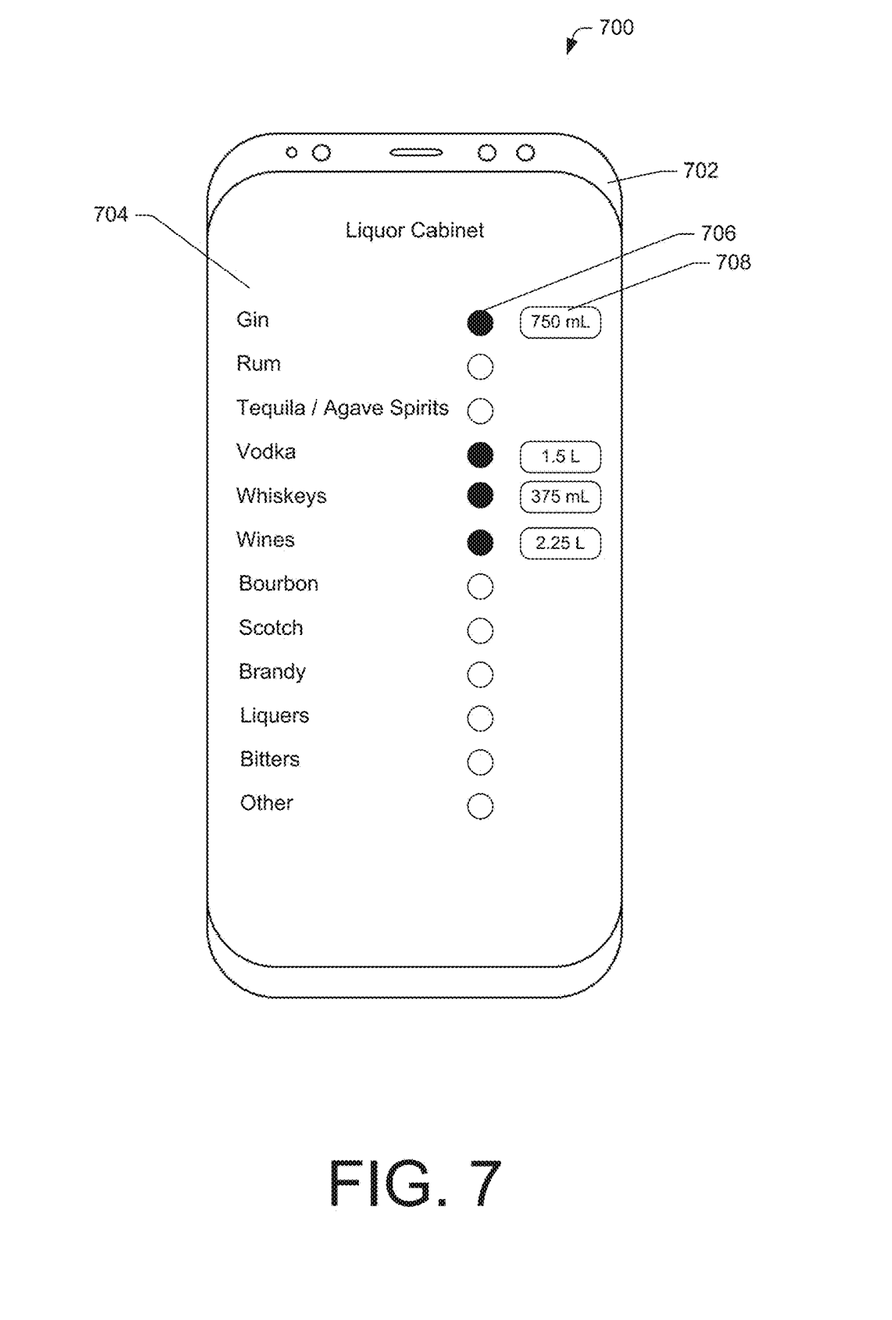
FIG. 7 is an example user interface for display on a computing device.

FIGS. 5-7 are flow diagrams showing several processes for using a beverage coaster according to embodiments disclosed herein. It should be appreciated that the logical operations described herein with respect to FIGS. 5-7 may be implemented in software, in firmware, in special purpose digital logic, and any combination thereof. It should also be appreciated that more or fewer operations or steps may be performed than what is shown in the figures and described herein. These operations may also be performed in parallel, or in a different order than those described herein.

FIG. 5 illustrates an example process of a beverage coaster in communication with a computing device. At block 502, the electronics within the beverage coaster are activated. This may be performed, for example, by depressing a button on the beverage coaster, by tapping on the coaster to register an input through the load cell, or through some other mechanism. As another example, the beverage coaster may be "always on" and running in a low power state until the beverage coaster links with a computing device through its wireless transceiver. In other embodiments, the beverage coaster includes a piezoelectric transducer, and in response to a mechanical input, such as a load being place on the coaster, a shaking of the coaster, or a tapping on the coaster, the piezoelectric transducer converts the kinetic energy into electrical potential energy sufficient to "wake up" the beverage coaster and activate the coaster electronics, such as the wireless transceiver or the load cells or both.

The beverage coaster may enter a sleep state, or a low power state, in the absence of a wireless signal received by the wireless transceiver, after a predetermined amount of time with no activity or wireless communication, or in the absence of a load upon the beverage coaster for a predetermined period of time. A sleep state may also be entered by user input, such as through pushing a button or a series or pattern of taps on the beverage coaster, or through an input into the computing device that sends a signal to the beverage coaster with a command to enter the sleep state.

At block 504, the beverage coaster pairs with a computing device, such as by broadcasting its presence over a BLE signal as a discoverable device. The pairing mode may be initiated every time the beverage coaster is turned on, or in response to a user input, such as pushing a button, or introducing a load on the load cell. Once the beverage coaster and the computing device are paired, data can be exchanged between the two. For instance, the beverage coaster may send a digital signal output from the A/D converter that corresponds to a weight measurement. Similarly, the computing device may send a command to the beverage coaster, such as a tare command or a calibration signal.

At block 506, a first weight measurement is sent to the computing device. Assuming that the load cells have previously been calibrated, the first weight measurement may indicate the presence of a container on top of the beverage coaster. The computing device may provide a notification that a container has been placed on the beverage coaster, and may additionally identify the container based upon comparison of its weight to the known weights of various containers stored in a database.

At block 508, the beverage coaster communications a second weight measurement with the computing device. The second weight measurement may be associated with a substance being put into the container. Moreover, the second weight measurement may continually or periodically updated as a substance is being put into the container. For example, as a user pours liquid into the container, the beverage coaster may continually update the running total weight that has been added. The weight measurement communicated by the beverage coaster to the computing device may happen as fast as is practicable given hardware and software delay times and any wireless communication delay. In many instances, the delay times are so miniscule that the weight measurement being delivered to the computing device may appear to be instantaneous, or in real-time. As used herein, the phrase "real-time" is used to mean as fast as is practicable given latency in hardware, software, and communication. It should be appreciated that communicating a weight measurement to the computing device may include computing a digital signal that is translated by the computing device into a weight that can be displayed on the computing device. It does not necessarily indicate that the beverage coaster has calculated an actual weight based upon the load cell signal and communicates an actual weight measurement, although the beverage coaster could be configured in this manner.

FIG. 6 illustrates an example process for using the beverage coaster from the perspective of the computing device. As previously indicated, some of the processes illustrated in FIG. 6 may be omitted, rearranged, or additional steps may be introduced. At block 602, the computing device receives input indicating one or more available ingredients. For example, a user may indicate to the computing device which alcoholic ingredients are available to the user for preparing a mixed beverage. The identification may further include a volume of the ingredient that is available. For example, a user may indicate that 10 fluid ounces of vodka and 750 mL of gin are available for preparing mixed beverages. This information may be stored in a database on the computing device. Moreover, as the computing device becomes aware that the user has used some of these ingredients to prepare beverages, the available amount of ingredients may be automatically updated. Furthermore, when the amount of available ingredients drops below a threshold amount, the computing device may prompt the user that the available ingredients is below a threshold and offer the user the opportunity to purchase additional ingredients.

At block 604, the computing device receives an input associated with the selection of an available recipe. The computing device may display one or more recipes that are available for selection. The user may indicate a desired recipe, such as by utilizing a touch screen on the computing device to indicate a desired recipe. The available recipes may be sorted, filtered, or otherwise organized for viewing. For instance, one or more recipes may be tagged as favorite recipes and can be recalled quickly. Available recipes may also be filtered based upon the available ingredients stored within the database.

At block 606, the computing device displays the recipe ingredients. This may be in response to a user selecting a number of servings, upon which the quantity and volume of ingredients may be updated.

At block 608, the recipe instructions are displayed. The instructions may initially indicate to the user to place a container, such as a cocktail shaker, upon the beverage coaster. The recipe instructions may then instruct the user to add various ingredients in the necessary volumes. As the user adds the ingredients, the beverage coaster can determine the additional weight being added to the beverage coaster, which can be correlated to a volume of the particular ingredient being added. For example, the computing device may maintain a database of weights and measures of various ingredients. These weights and measures may include a specific gravity and/or density of various liquids and items. The specific gravity and/or density can be used to correlate weight to volume. Therefore, where a recipe specifies a volume of liquid to be added, as liquid is added and its weight is measured, the computing device may determine the volume that has been added to the container.

At block 610, the computing device wirelessly pairs with the beverage coaster, such as through a BLE connection. The connection may be initiated by pressing a button on the beverage coaster that may put the beverage coaster into a pairing mode in which it broadcasts its presence. The computing device may detect the presence of the beverage coaster and may pair with it to provide for bi-directional communication between the beverage coaster and the computing device. Of course, the pairing may occur at any point in the process illustrated in FIG. 6, and may even be the first step in the process.

At block 612, the computing device receives a weight measurement from the beverage coaster. The weight measurement may be associated with the weight of a container or may be associated with a weight of an added ingredient to the container.

At block 614, the beverage coaster weight measurement is tared. In other words, where a container is the first item placed upon the beverage coaster, the beverage coaster may be "zeroed" so as to ignore the weight of the container in the total weight measurement. Of course, the computing device may simply ignore the weight of the container and need not tare the beverage coaster weight measurement at all, but rather simply track the cumulative additions to the container as it displays the progress of the recipe.

At block 616, the computing device receives an intermediate weight measurement from the beverage coaster. The intermediate weight measurement may be associated with the addition of liquid to the container that is upon the beverage coaster. In some embodiments, multiple intermediate weight measurements are received by the computing device. In some embodiments, intermediate weight measurements are received at a rate that allows the computing device to continually update its display of the total volume of ingredients as the ingredients are being added to the container.

At block 618, the computing device updates its display to reflect the intermediate weight measurement. The updated weight measurement may appear to occur as the ingredients are added to the container. Taking into account hardware, software, and communication lag times, which may be on the order of milliseconds, the display on the computing device may appear to be updating as the ingredients are actually being added. The intermediate weight measurements may be received by the computing device at such a speed to allow the computing device to indicate when the necessary volume of an ingredient has been added, and allow the user to stop adding additional ingredient without going over a threshold amount of the ingredient.

However, where the volume of an ingredient is added in such a volume as to exceed a threshold amount above the volume indicated by the recipe, the computing device may recalculate the serving size and instruct the user to add additional ingredients to maintain a ratio of ingredients within the container.

At block 620, an indication may be provided to a user of the beverage coaster that a volume of ingredient added to the container meets a target volume of that ingredient based upon the recipe and the serving size. In other words, where a user is instructed to add 0.25 fl. oz. of vermouth, the display on the computing device may update as the user adds the ingredient. As the total volume of vermouth reaches a target threshold, a notification is given to the user that the proper amount of vermouth has been added to the container. If, however, the user adds more than the required amount, such that the amount is above a threshold amount, such as 10% for example, the computing device may instruct the user to add additional amounts of gin to maintain the proper ratio of gin to vermouth according to the martini recipe that the computing device is instructing the user to make.

The indication may be visual, such as a graphic showing the actual volume of ingredient compared to a target volume of ingredient. The indication may also be auditory or visual. In some embodiments, the computing device outputs an audible signal when the target volume of an ingredient has been reached. This allows the user to focus on pouring the ingredient into the container without having to watch the display of the computing device. In some embodiments, the indication may be visual, such as by a light within the coaster. As an example, a light may flash, slowly at first, and as the target volume is approached, the light may flash faster and faster until the target volume is met at which point the light may continually be illuminated. Alternatively, the light may display green light to indicate to the user to continue adding ingredients. The light may change to yellow to indicate that the volume of ingredient is approaching the target volume, and then turn red when the target has been reached.

With reference to FIG. 7, a sample user interface 700 is provided on the computing device 702 that allows a user to enter the amount of available ingredients. The user interface is provided as part of an application that may be installed on a computing device 702, such as a mobile computing device. As shown, the display may be provided in multiple columns the first column 704 indicating an ingredient, the second column 706 indicating whether some of the ingredient is available, and a third column 708 that allows a user to enter the volume of available ingredient.

In some embodiments, as the computing device is used in conjunction with the beverage coaster to facilitate a user following a recipe, the volume of ingredients used for the recipe may be tracked and subtracted from the volume of available ingredients. Accordingly, when the volume of available ingredients reaches a minimum threshold value, the user may be prompted to purchase additional ingredients to replenish the available supply. The user may be provided with a method of purchasing additional ingredients, such as a link to an online shopping and/or delivery service. The minimum threshold may be specified by the user, by the consumption rate of the ingredient, by the computing device, or by some other metric or combination of metrics. In some cases, where the computing device tracks that the user historically consumes 750 mL of vodka each month, as the volume of available vodka drops below a threshold volume, such as 250 mL, for example, the user may be prompted to purchase additional vodka and may be provided with an option for purchasing additional vodka directly from the computing device. In some embodiments, the user may be presented with an opportunity to purchase additional ingredients at a discount. As an example, a user may be provided with a link to purchase a certain brand or certain type of vodka for a discounted price. The discount may be provided, in some cases, in response to the volume of available vodka dropping below a threshold volume.

Of course, the illustrated user interface is only provided as an example, and many other layouts, formats, and submenus may be possible without deviating from the description provided herein.

Figure 8:
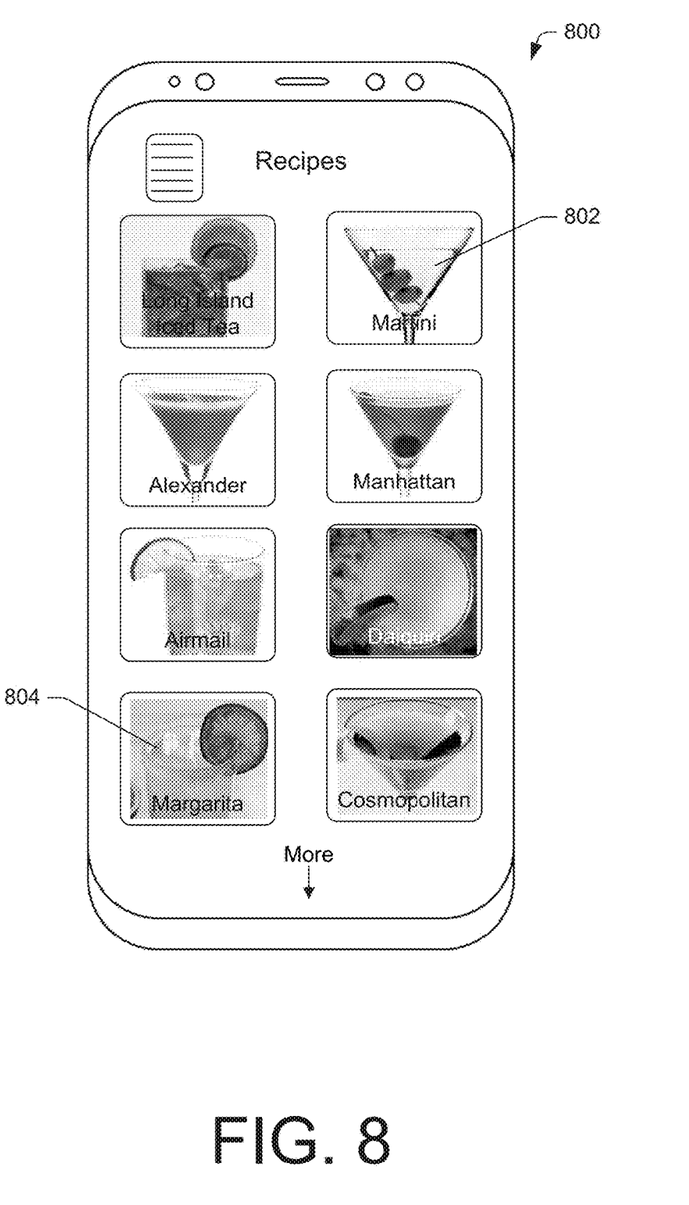
FIG. 8 is an example user interface for display on a computing device.

With reference to FIG. 8, a sample user interface is illustrated that provides a user with categories of recipes to select from. The recipes may be added by the user, may be downloaded from a repository, may be preloaded in the user interface, or may be pushed to the device by a third party. For example, in some cases, a user may manually enter a recipe. A user may also browse available recipes from one or more repositories of recipes and select one or more recipes for download onto the user device. In other cases, a third party, such as the developer of the application, or a beverage distiller or distributor, may push a recipe to the device of a user. In these cases, a user may opt-in to receive new recipes. The user may be incentivized to opt-in to receiving new recipes, such as by receiving discounts on ingredients or being included as a test-customer for new products or flavors.

The available recipes may be categorized. For example, one or more recipes for a martini 802 may be categorized together and represented by a martini logo. Similarly, one or more margarita recipes 804 may be categorized together. Of course, other forms of recipe categorization may be provided, such as by primary ingredient. That is, a user can select recipes that use rum as a primary ingredient and view available recipes that fit this criteria. A user may be able to indicate a rating of one or more recipes, or designate some recipes as "favorites." Through this type of user input, the recipes can be sorted, presented as a list of favorites, searched for ingredients that appear frequently in the recipes, or used to recommend additional recipes similar to those highest rated recipes by the user.

Figure 9:
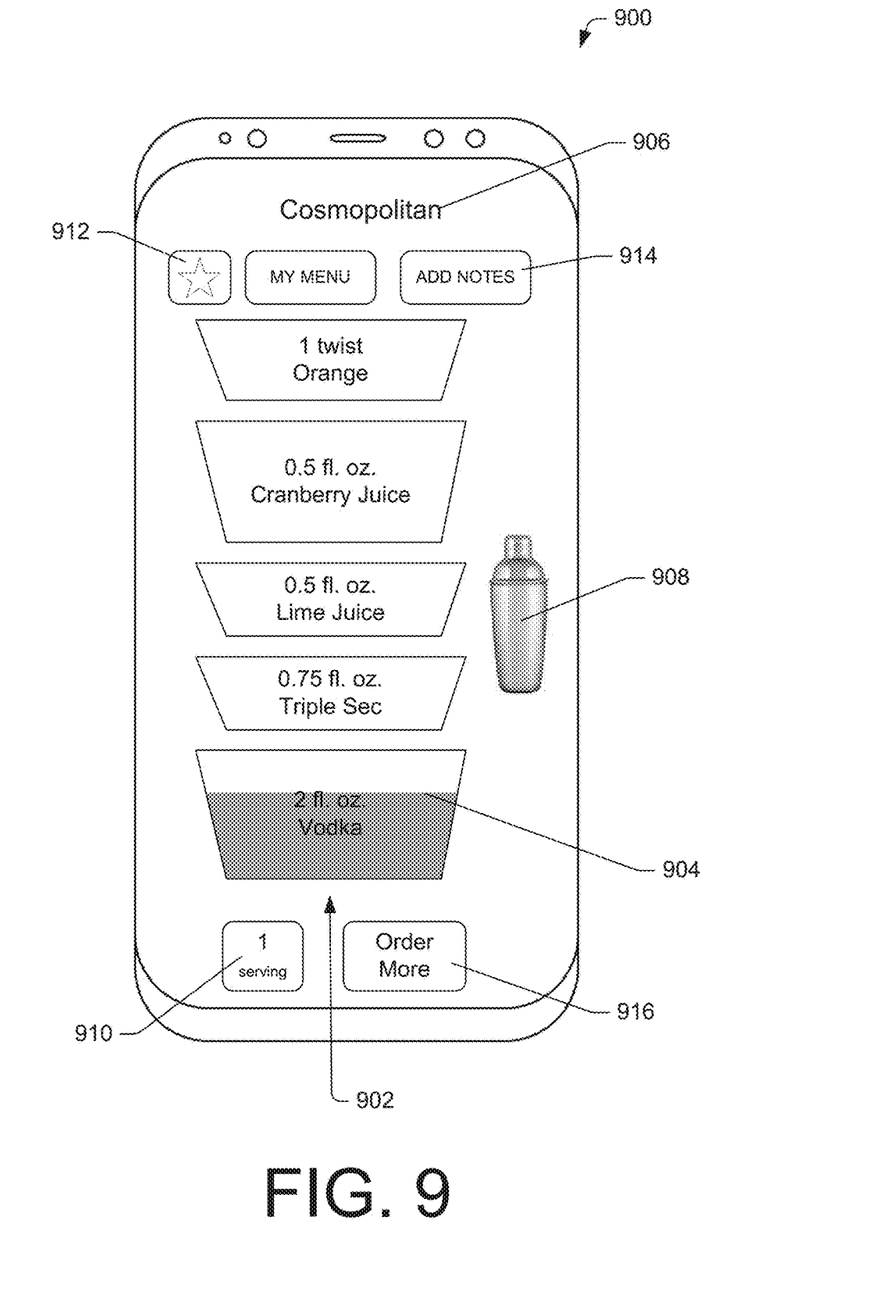
FIG. 9 is an example user interface for display on a computing device showing a build column as weight data is received from a beverage coaster.

FIG. 9 illustrates another user interface 900 that can be used in conjunction with the beverage coaster 102. In the illustrated user interface, a build column 902 shows the list of ingredients and a mixology progress indicator 904. Once a user selects a recipe, the user interface 900 may display a title of the recipe 906. A list of ingredients may additionally be displayed in the build column 902, and a container 908 can be displayed to indicate to the user the type of container to be used for mixing the beverage.

A serving size indicator 910 indicates how many servings the recipe will result in. A user may alter the number of servings within the serving size indicator 910 to scale the recipe for additional servings. Additionally, a user may provide an indication that he would like to double the amount of alcohol in the mixed beverage and the computing device may adjust the recipe accordingly and display the adjusted recipe in the build column 902 in the predetermined proportions.

Instructions can be provided to the user. Initially, the instructions may prompt the user to connect the computing device to the beverage coaster, such as through the BLE connection. The instructions may further provide step-by-step instructions for connecting the computing device to the beverage coaster. The instructions may be visual, such as by displaying them on the computing device, or may be provided verbally through the speaker of the computing device, or may be provided through a combination of delivery methods or provided in some other manner.

The instructions may further prompt a user to place the indicated container 908 on the beverage coaster. The beverage coaster can provide a weight measurement of the container to the computing device and the computing device may be able to determine that the appropriate container has been place on the beverage coaster based upon the measured weight of the container.

The instructions may then prompt the user to add 2 fl. oz. of vodka to the container. The beverage coaster can provide continually updated weight measurements to the computing device and the computing device can display the amount of vodka added to the container, which may be in real time. That is, the display can be updated to indicate the actual amount of ingredients added to the container such that when the display indicates the required amount of ingredient is added to the container, the user can stop adding the ingredient and the actual amount of ingredient in the container will be very near the required amount of ingredient. As the user pours the ingredient, the progress indicator 904 can track the progress toward the required amount and provide visual feedback as to the progress toward the target amount of ingredient. Additionally, the computing device may provide audio feedback representing the progress so that the user need not watch the display of the computing device to be able to track progress toward the target amount of ingredient. The audio feedback may include, for example, voice feedback indicating the progress, a countdown until the target amount is reached, an rising or falling pitch, or some other form of audio feedback that indicates when the target amount of ingredient is reached.

The instructions may then proceed to the next step and instruct the user to add 0.75 fl. oz. of triple sec. The user interface may proceed in this manner to track the total amount of ingredients added to the container. It should be noted that while the recipe instructions are shown in volumetric measurements and the beverage coaster provides weight measurements, the computing device is able to calculate the added volume based upon the indicated weight. This may be accomplished, for example, by accessing a database that includes volume to weight conversions, or alternatively or additionally, includes liquid density for one or more of the ingredients in the recipe.

If a user adds too much of an ingredient, the computing device may scale the recipe to account for the excess ingredient and may provide further instructions for maintaining the predetermined ratio of ingredients. For example, if the user adds 2.5 fl. oz. of vodka instead of the target 2 fl. oz., the recipe may indicate that it has now recalculated the recipe to make 1.25 servings and adjust the remaining ingredients accordingly based upon the initial ingredient ratios and provide updated instructions.

The user interface 900 may include additional features, such as for example, a "favorite" button 912 that allows a user to indicate that the recipe is a favorite of the user. Additional features may include an option to add notes 914 which allows the user to add personal notes related to the beverage, the instructions, or the process that can be accessed at a future time. An additional feature may provide an "order more" button 916 that may allow the user to order additional ingredients. The order more button 916 may provide a link to an online retailer, a local delivery service, or some other form of service that allows the user to conduct a transaction to purchase additional ingredients.

Figure 10:
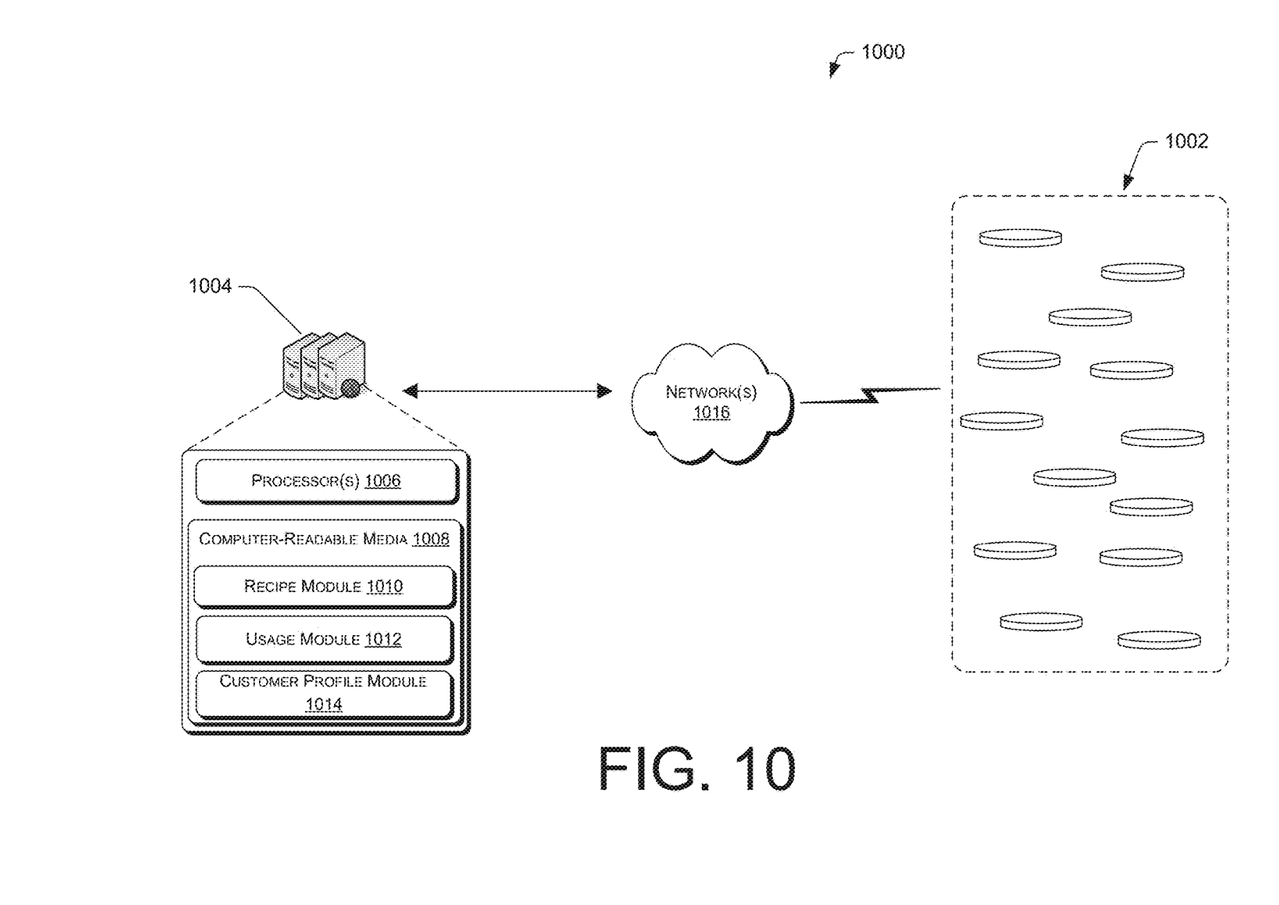
FIG. 10 illustrates a system in which a plurality of beverage coasters provide information to a common computing resource.

With reference to FIG. 10, a system 1000 is shown in which a plurality of beverage coasters 1002 are distributed to various locations and ultimate end users. The beverage coasters 1002 may each be associated with a computing device (not shown). The beverage coaster, or the computing device, or both, can communicate with a central server 1004 in order to send information related to the use of the beverage coasters 1002.

The central server 1004 may have one or more processors 1006 and computer-readable media 1008. The computer-readable media 1008 may be non-transitory media, such as removable or non-removable hardware-based media which may store various modules, instructions, or routines. The computer-readable media 1008 may store a recipe module 1010, a usage module 1012, and a customer profile module 1014, among others.

The recipe module 1010 may store a collection of recipes, such as in a database, and can push recipes out to one or more of the plurality of beverage coasters 1002. The recipes may be pushed based upon a variety of factors, such as a features recipe, a featured ingredient, a popular recipe, or some other factor. The beverage coasters 1002 can communicate with the central server 1004 over a network 1016, such as the Internet. While the description references the beverage coasters 1002 communicating with the central server 1004, it should be appreciated that in those embodiments where the beverage coasters 1002 are not configured for Internet communications, the communication is between a computing device associated with individual ones of the beverage coasters 1002 and the central server 1004. For instance, a computing device may be associated with a beverage coaster by pairing with the beverage coaster, such as through Bluetooth, or Bluetooth Low Energy wireless communication, and the computing device may be responsible for communicating with the central servers 1004 in order to exchange information including, among other things, recipes, usage statistics, product orders, offers, and the like.

In some situations, a beverage company, such as a distiller, manufacturer, or distributor may wish to provide a beverage coaster to one or more of its customers. The beverage coaster may be provided as a promotional item or may be sold to customers. In some cases, the computing device associated with a user of the beverage coaster may be required, or encouraged, to register the computing device with the beverage company. In this way, the beverage company can collect statistics related to available ingredients, point of use consumption data, and a preference for specific recipes or ingredients, among other types of information. In return, the beverage company may push additional recipes, discounts, opportunities to order additional ingredients, or other promotions or notifications to the user.

The beverage coaster may be distributed with instructions for downloading a software application to the computing device of the user. The software application may be provided by the beverage company and may therefore be branded to reflect the source of the beverage coaster and the software application, and may further promote recipes or ingredients that feature the beverage company's products. Similarly, the beverage coaster itself may be branded.

The customer profile module 1014 may store information related to an individual beverage coaster as the central server 1004 receives information. For instance, a beverage coaster may send information to the central server 1004 and may include an identifier specific to the individual beverage coaster. In this way, the customer profile module 1014 can associate a specific beverage coaster with a particular customer. This association may also be enhanced through information shared with registration of an application, as described.

The computing device may additionally provide information to the central servers 1004 regarding rating of recipes, personal notes regarding recipes or products, and may place orders for additional ingredients. Of course, other information may be shared with the central servers 1004 that is not specifically described herein.

From the foregoing, it will be appreciated that, although specific implementations have been described herein for purposes of illustration, various modifications may be made without deviating from the spirit and scope of the appended claims and the elements recited therein. In addition, while certain aspects are presented below in certain claim forms, the inventors contemplate the various aspects in any available claim form. For example, while only some aspects may currently be recited as being embodied in a particular configuration, other aspects may likewise be so embodied. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A beverage coaster, comprising:
   a battery;
   one or more load cells selectively energized by the battery;
   a wireless transceiver;
   a user interface comprising a button and a light;
   a housing encompassing the battery, the one or more load cells, the wireless transceiver, and the user interface, the housing having an upper beverage holding surface that is less than sixteen square inches and having a thickness that is less than one-half inch thick; and
   a plurality of feet, the feet supporting the upper beverage holding surface and configured to support a weight of the beverage coaster,
   wherein the one or more load cells comprise one or more half-bridge load cells, the load cells being disposed between individual ones of the plurality of feet and the upper beverage holding surface.

2. The beverage coaster as in claim 1, wherein the user interface comprises only the button and the light.

3. The beverage coaster as in claim 1, wherein the wireless transceiver is a Bluetooth low energy transceiver and is configured to pair with a computing device.

4. The beverage coaster as in claim 3, wherein the one or more load cells are selectively energized by the battery in response to the wireless transceiver pairing with the computing device.

5. A system, comprising:
   a beverage coaster, the beverage coaster comprising:
   one or more load cells;
   a wireless transceiver;
   an upper surface configured to hold a beverage container and transfer a weight of the beverage container to the one or more load cells; and
   a computing device having one or more processors and one or more memories storing instructions that, when executed by the one or more processors, cause the computing device to:
   wirelessly communicate with the beverage coaster to receive data associated with a load exerted upon the upper surface;
   provide a user interface that displays a visual indication associated with the load exerted upon the upper surface; and
   provide mixology instructions to a user of the computing device to assist the user in adding one or more ingredients into the beverage container.

6. The system as in claim 5, wherein the upper surface of the beverage coaster has an area that is less than sixteen square inches.

7. The system as in claim 5, wherein a thickness of the beverage coaster is less than one-half of an inch.

8. The system as in claim 5, wherein the beverage coaster energizes the one or more load cells with electricity in response to a command from the computing device.

9. The system as in claim 5, wherein the beverage coaster further comprises a light source, the light source configured to provide feedback to a user of the beverage coaster in response to a signal received from the computing device.

10. The system as in claim 9, wherein the feedback provided by the light source is associated with the load exerted upon the upper surface and wherein the feedback changes in response to a change in the load exerted upon the upper surface.

11. The system as in claim 5, wherein the instructions further cause the computing device to receive a user input from the beverage coaster, the user input comprising data associated with a load exerted upon the beverage coaster above a threshold force for a time period below a threshold time.

12. The system as in claim 11, wherein the instructions further cause the computing device to send, in response to the user input, a command to the beverage coaster.

13. A method for using a beverage coaster with integrated electronics, comprising:
   activating the integrated electronics, the integrated electronics including a wireless transceiver and one or more load cells;
   establishing a wireless communication connection with a computing device;
   sending, to the computing device, first data associated with a first load being applied to an upper surface of the beverage coaster;
   sending, to the computing device, second data associated with a second load being applied to the upper surface of the beverage coaster; and
   storing, by the computing device, usage data associated with the first data, the usage data indicating an identification of an ingredient and a volume of the ingredient.

14. The method as in claim 13, further comprising activating a first visual indicator of the beverage coaster, the first visual indicator being associated with the first data, and activating a second visual indicator in response to the second data.

15. The method as in claim 14, wherein the first visual indicator is a light exhibiting a first color, and the second visual indicator is the light exhibiting a second color.

16. The method as in claim 13, further comprising sending, by the computing device, the usage data associated with the first data to a central server.

17. The method as in claim 13, further comprising presenting, on a display associated with the computing device and in response to the usage data, an offer to purchase additional volume of the ingredient.

* * * * *